March 8, 1960  J. D. TURLAY ET AL  2,927,564

CHARGE FORMING APPARATUS

Filed Sept. 17, 1956  4 Sheets-Sheet 1

INVENTORS
Joseph D. Turlay, &
Nelson W. Kunz
BY
L. D. Busch
ATTORNEY

March 8, 1960     J. D. TURLAY ET AL     2,927,564
CHARGE FORMING APPARATUS
Filed Sept. 17, 1956     4 Sheets-Sheet 4

INVENTORS
Joseph D. Turlay &
Nelson W. Kunz
BY
L. D. Burch
ATTORNEY

United States Patent Office 2,927,564
Patented Mar. 8, 1960

2,927,564

CHARGE FORMING APPARATUS

Joseph D. Turlay, Flint, and Nelson W. Kunz, Flushing, Mich., assignors to General Motors Corporation, Detroit, Mich., a corporation of Delaware Application September 17, 1956, Serial No. 610,204

8 Claims. (Cl. 123—52)

This invention relates to charge forming apparatus for an internal combustion engine and more particularly to an induction system and intake manifold therefor that will obtain a high volumetric efficiency in the charging of the engine cylinders with a fuel and air mixture. It is essential that the charges for all of the cylinders be substantially identical in all respects in order to obtain the maximum performance and economy from a multiple cylinder internal combustion engine. Various configurations to facilitate the charging of the cylinders have been devised in the past in attempts to accomplish this objective. Although these manifolds have produced acceptable results, the induction passages have presented resistances to the flow of the charges therethrough that materially limit the power developed by the engine. The various resistances have not always been identical under all operating conditions and consequently the charges delivered to the various cylinders have not been identical.

An induction system embodying the invention includes an intake manifold in which all of the various induction passages are substantially identical to each other. This is achieved by providing the intake manifold with a main body portion that forms a plenum chamber having an inlet adapted to draw air from the atmosphere and a plurality of tubes or ram pipes that interconnect the plenum chamber with the intake passages in the engine to form a plurality of substantially identical induction passages. These induction passages are shaped so that the columns of air therein will acquire sufficient momentum during the charging cycle to ram the charges into the cylinders and thereby dynamically supercharge the engine cylinders. In addition, the length, shape, etc. of the passages may be arranged to tune the passages to resonate during one or more engine operating conditions. During such conditions the surges of air resulting from the opening and closing of the intake valves will reinforce each other and thereby materially increase the ram effect.

Intake manifolds embodying the invention are especially adapted for V-type engines. The main body of the manifold includes a plenum chamber preferably formed as a rectangular box having one end connected with a throttle controlled intake passage and a top cover plate to which ram pipes are secured. The ram pipes conduct air from the plenum chamber to the engine cylinders.

Figure 1:
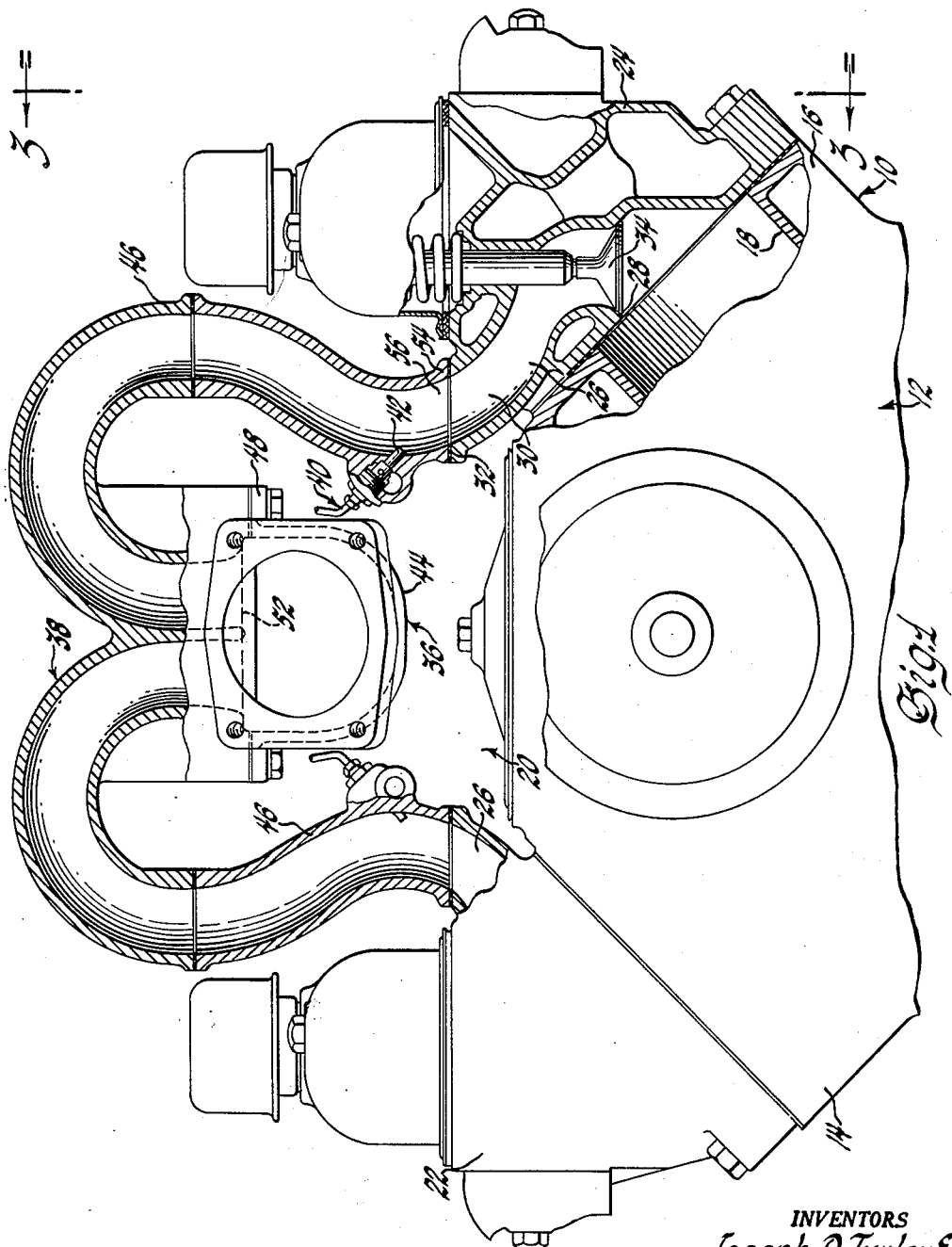
Figure 1 is a fragmentary end view of an engine employing an induction system embodying the invention and having parts broken away and in section.
Figure 2:
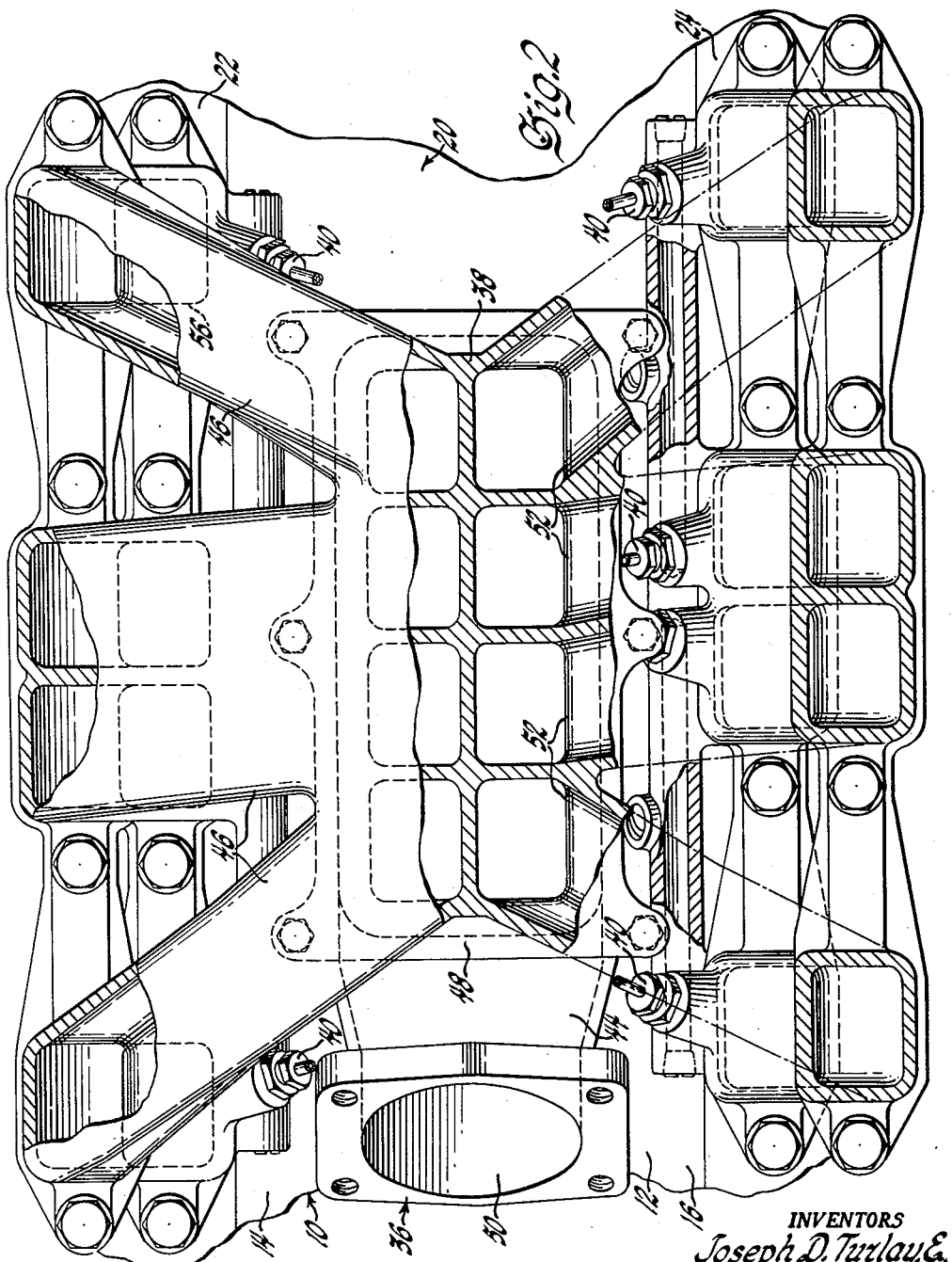
Figure 2 is an enlarged fragmentary plan view of the engine of Figure 1.
Figure 3:
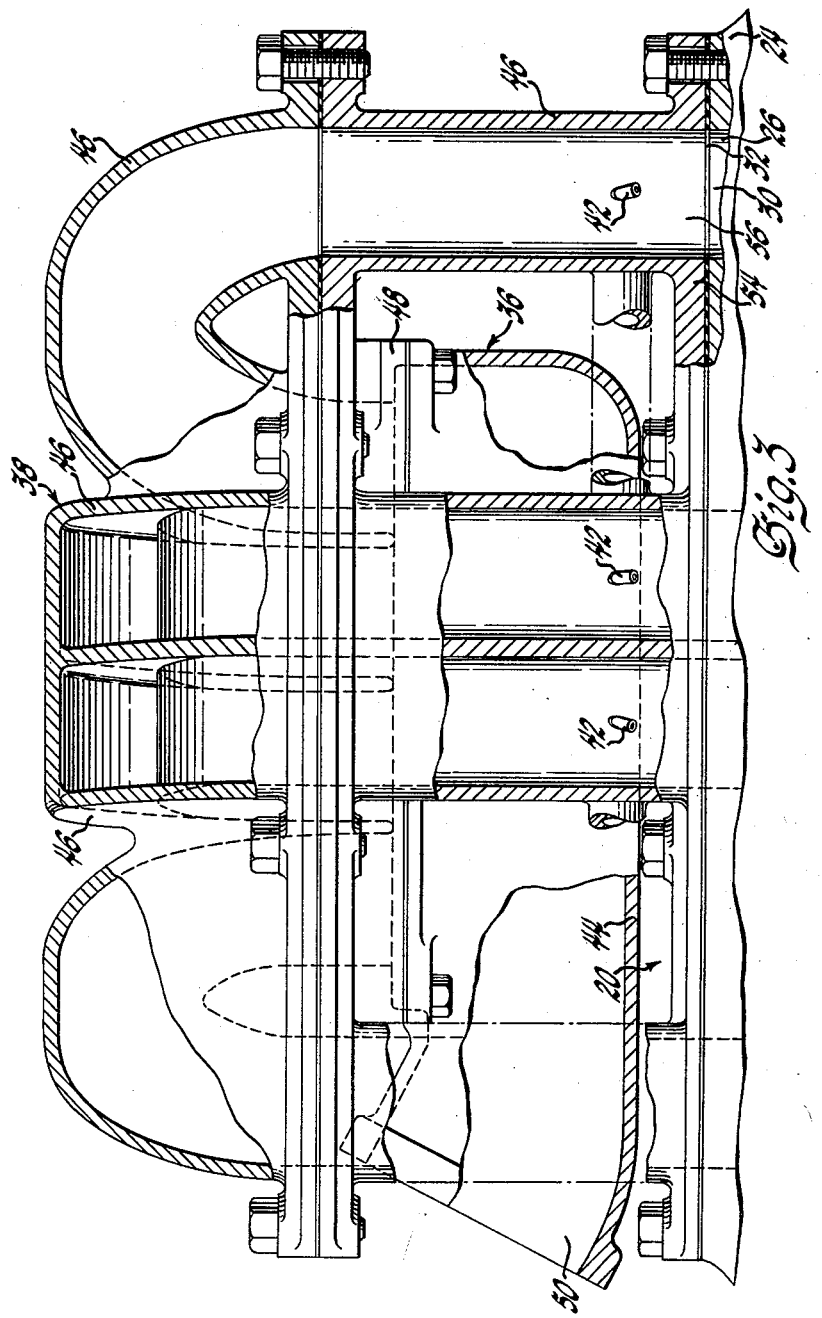
Figure 3 is an enlarged view of the engine induction system taken in the direction of arrows 3—3 of Figure 1, with parts broken away and in section.

Although the invention may be employed on an internal combustion engine of any suitable design, in the present instance it is shown as being adapted for use on a V-type engine 10. Engine 10 includes a cylinder block 12 having a pair of angularly disposed banks 14 and 16 of cylinders 18 with an upwardly directed space 20 therebetween. Separate cylinder heads 22 and 24 are secured to the respective banks 14 and 16 so that the intake passages 26 formed within cylinder heads 22 and 24 extend longitudinally along the opposite sides of the space 20. Individual intake passages 26 are provided for each cylinder and extend through the heads 22 and 24 with the inner ends forming valve seats 28 communicating with the combustion chambers and the outer ends thereof forming intake ports 30 in the faces 32. Intake valves 34 are disposed in each of the seats 28 and actuated by the engine camshaft to time the flow of charges into the cylinders 18.

The combustion mixture of air and fuel for charging the cylinders may be supplied by charge-forming means 36, which is disposed above the space 20 between the two cylinder banks 14 and 16. The charge-forming means 36 includes an air induction system 38 and a fuel injection system 40 responsive to the fuel demands of the engine 10 and effective to inject metered fuel from the nozzles 42 into the charge in proper proportion to air flow.

The induction system 38 includes an intake manifold having a main body 44 and a plurality of ram pipes 46 which extend initially upwardly therefrom and curve partially around the main body 44 to connect to intake ports 30 in faces 32. The body 44 includes a cover 48 that extends over the top thereof and is adapted to receive ram pipes 46 whereby the ram pipes are secured to body 44 in fluid-receiving relation. One end of body 44 includes an inlet tube 50 that projects longitudinally and may be connected to any suitable source of induction air. A throttle valve may be provided for regulating the volume of the air flow and if desired a metering restriction such as a venturi for developing a metering signal for controlling the fuel injection system 40 may also be included.

The ram pipes 46 are all substantially identical with each other and may be formed of cast sections or of tubing preformed to the desired configuration. The inlet ends 52 of the ram pipes may be flared to open into the plenum chamber formed by the main body 44 in rows along opposite sides of the cover 48. The outlet ends 54 of the ram pipes are secured to the cylinder head faces 32 by any suitable means such as bolts so that the openings 56 formed by the outlet ends 54 will register with the intake ports 30 in the cylinder blocks. Thus the ram pipes 46 and intake passages 26 and 30 will form induction passages originating adjacent the cover 48 of the plenum chamber 44 and terminating adjacent the intake valves 34.

By employing the rectangular box type main body in the position described, the volume of the plenum chamber may be greatly diminished to facilitate the throttle valve in the inlet tube 50 retaining full control over the flow of the induction air at all speeds including idle. At the same time the plenum chamber will permit a uniform flow of air through the chamber while confining any surges of air to the ram pipes. The bottom of chamber 44 may be curved as shown in Figure 1 to aid smooth air flow.

The ram pipes are so curved as to very nearly approximate the effectiveness of a straight pipe. Straight pipes of some predetermined length are generally desirable for use in an induction system of the type described. In order to position the required pipe length under the automobile hood, however, it is necessary to modify the pipes so that they will not interfere with engine accessories nor hamper the proper location of the fuel injection nozzles. The curved pipes allow the injection nozzles to be accurately aimed at the back of the intake valves, as shown in Figure 1, and at the same time allow a greater working length of pipe to be used in a smaller space. Previous pipes have consisted of a series of portions in which there are a number of abrupt changes in radial acceleration imparted to the fluid along the contour of the pipe. These abrupt changes cause discontinuity in the rate of change of acceleration and resultant shock losses. The magnitudes of the losses encountered are dependent upon the discontinuity differentials resulting from the abrupt changes in radial acceleration.

Figure 4:
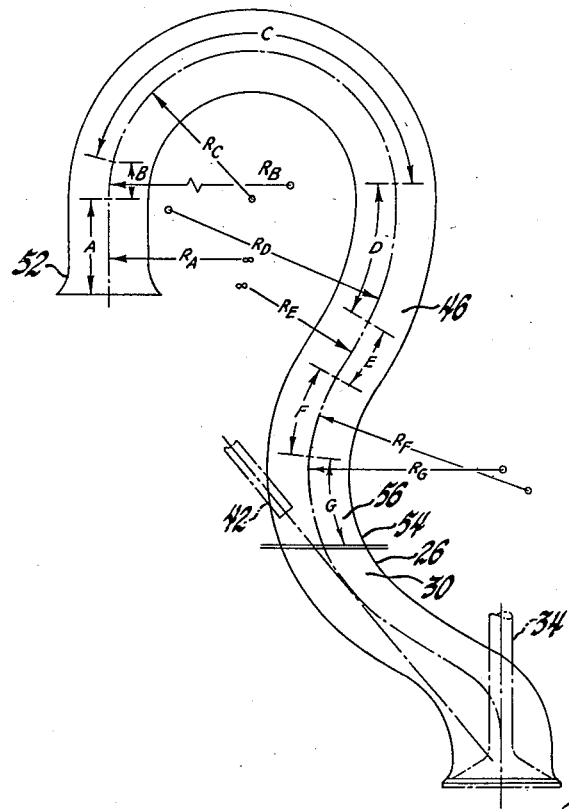
Figure 4 is an enlarged diagrammatic view of a modified ram pipe embodying the invention.

As shown in Figure 4, ram pipes embodying the invention incorporate transition sections of large radii between the curved and straight portions of the pipe. These transitions have radii of curvature which may or may not be in the planes of the radii of curvature of the adjacent portions. The adjacent portions may be oppositely curved, thus placing the center of curvature of one of the adjacent sections on the opposite side of the center line of the pipe from the center of curvature of the other adjacent section. The actual radial lengths may be referred to as true radii of curvature without regard to direction. By providing transition sections having larger true radii of curvature than the radii of curvature of adjacent sections, more satisfactory radial accelerations are obtained when a reversal of curvature is required. Similarly, use of transition sections having intermediate true radii of curvature relative to their adjacent sections when no reversal of curvature is involved gives more desirable flow characteristics.

The ram pipe of Figure 4 has sections of the following characteristics:

Section A—straight (radius of curvature $R_A$ is infinite), with a flared inlet 52; section B—curved, with radius of curvature $R_B$; section C—curved, with radius of curvature $R_C$; section D—curved, with radius of curvature $R_D$; section E—straight, $R_E$ is infinite; section F—curved, radius of curvature $R_F$, which is on the opposite side of the pipe center line from $R_D$; section G—curved, with radius of curvature $R_G$. Section G is flared into intake passage 26. The radii of curvature have the following relationships in this embodiment:

$$R_A > R_B > R_C < R_D < R_E > R_F > R_G$$

Figure 6:
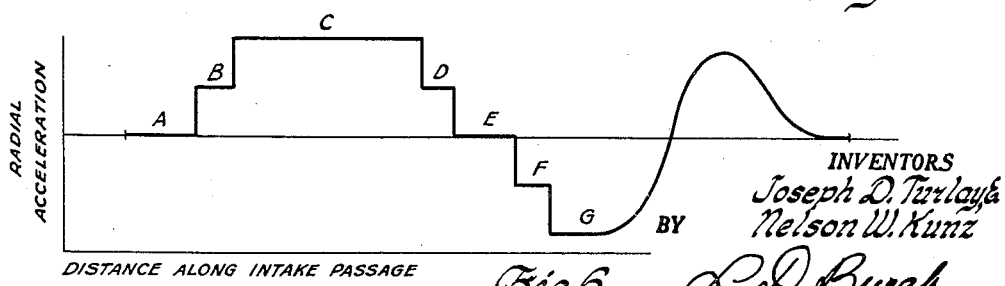
Figure 6 is an air flow radial acceleration curve obtained from the modified ram pipe of Figure 4.

Thus transition section B has a radius of curvature intermediate the radii of curvature of sections A and C, transition section D has a radius of curvature intermediate the radii of curvature of sections C and E, transition section E has a radius of curvature greater than either sections D or F, and transition section F has a radius of curvature intermediate the radii of curvature of sections E and G. The resulting radial acceleration curve is illustrated in Figure 6 in which the ram pipe sections A through G and intake passage 26 produce the radial acceleration curve as shown. With ram pipes of this configuration the shock losses are reduced considerably and performance very nearly approaches that of a straight pipe. The changes in radial acceleration are less abrupt, thereby decreasing the shock losses resulting from the discontinuity in the rate of change of acceleration.

Figure 5:
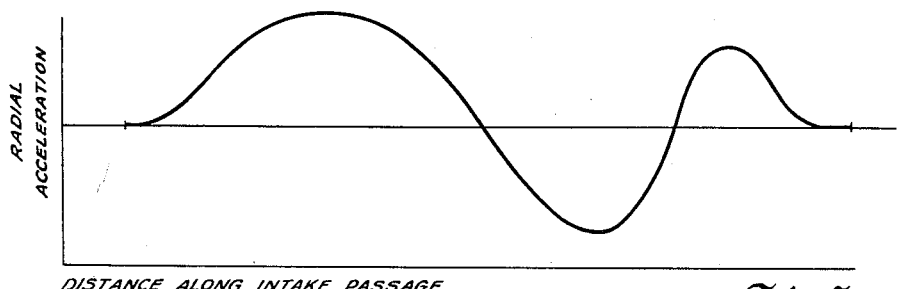
Figure 5 is an air flow radial acceleration curve obtained from the ram pipe of Figure 1.

The curve in Figure 5 results from a further improved ram pipe of the type illustrated in Figure 1 in which the flow characteristics are obtained by use of a cam contoured pipe having no abrupt changes in acceleration. The radius of any section of this ram pipe changes in infinite increments along the section of the pipe somewhat in the manner of radial variations along a spiral. A continuously varying contoured pipe having no abrupt changes in acceleration produces a smooth and continuous rate of change of acceleration curve as illustrated in Figure 5.

It is desirable to minimize or prevent shock losses at all points in the induction system, particularly in the ram pipes from the entry 52 to the head of valve 34. A greater ramming effect is obtained with a decrease in such losses since the energy contained in the momentum of the air column is not dissipated. This desirable result is obtained by providing transition sections whereby the radial accelerations in the system are gradually increased from zero as the air flow follows a curved path and are gradually decreased to zero during other portions of the curved path. Transition sections are especially important when conducting a flow of air through a reverse bend such as that shown in the pipe 46 in Figure 4, for example. The curves of Figures 5 and 6 with that of the radial accelerations in ram pipes embodying the invention are gradually changed so that they blend together in a manner to substantially reduce shock losses at all transition points.

It may thus be seen that an intake manifold has been provided in which the opening of the intake valves will cause the columns of air in the induction passages to acquire sufficient momentum to materially increase the ramming effect in charging the cylinders. In addition, the lengths of pipe may be chosen so that during one or more operating conditions the timing of the surges produced by the opening and closing of the intake valves will approach the natural periods of the induction passages and the surges will reinforce each other. When this phenomenon occurs the columns of air will have even more momentum that will further increase the ramming of air into the cylinders with a minimum of shock loss to thereby dynamically supercharge the engine.

What is claimed is:

1. For an internal combustion engine having a plurality of combustion chambers, a tuned intake manifold having an induction passage therein, said passage having first and second portions in reversely bent relationship and connected by a transition section including a straight portion, said bent portions having sections on opposite sides of said transition section and immediately adjacent thereto with true radii greater than the true radii of the more remote sections of said first and second portions whereby radial acceleration shock losses are maintained at a minimum.

2. In an air mass intake system for an internal combustion engine having a combustion chamber and a cylinder head, an intake passage adapted to conduct air mass to said combustion chamber and comprising first, second and third elements, said first element having a straight entrance portion and a uniformly varying radius of curvature portion; said second element having a uniformly varying radius of curvature first portion in smooth flowing relationship with said first element, a uniformly varying radius of curvature reverse bent second portion, and a uniformly varying third portion; said third element including a passage in said cylinder head connecting said second element to said combustion chamber.

3. A tuned air flow passage for dynamically charging an internal combustion engine, said passage comprising a straight entrance section, a first bent section in flow sequence with said entrance section, a second bent section in flow sequence with said first bent section and having at all points lesser radii of curvature than said first bent section, a transition section in flow sequence to said second bent section and having greater radii of curvature at all points than said second bent section and including a portion at the end opposite said second bent section having an opposite curvature to said second bent section, a third bent section in flow sequence to said transition section having radii of curvature less than the radii of curvature of said transition section and in a reverse direction to the direction of said first bent section radii of curvature, and a last section in flow sequence to said third bent section having such radii of curvature that radial accelerations of air flow passing therethrough are smoothly and gradually reduced to substantially zero.

4. The passage of claim 3 in which an intermediate portion of said transition section is straight.

5. The passage of claim 3 in which the length of the radii of curvature of said transition section approach and vary between infinity and the lengths of the radii of curvature of said second and third bent sections.

6. The passage of claim 3 in which at least one of said bent sections has uniformly varying radii of curvature.

7. The passage of claim 6 in which at least one of said uniformly varying bent sections has decreasing radii of curvature in the direction of air flow.

8. The passage of claim 6 in which at least one of said uniformly varying bent sections has decreasing radii of curvature in the direction of air flow.

References Cited in the file of this patent

UNITED STATES PATENTS

| | | |
|---|---|---|
| 1,150,264 | Greer | Aug. 17, 1915 |
| 1,565,080 | Foust | Dec. 8, 1925 |
| 1,802,848 | Summers | Apr. 28, 1931 |
| 1,942,226 | Timian | Jan. 2, 1934 |
| 1,977,200 | Osterberg | Oct. 16, 1934 |
| 2,062,433 | Van Ranst | Dec. 1, 1936 |
| 2,119,879 | Hoffman et al. | June 7, 1938 |
| 2,505,962 | Hartley | May 2, 1950 |
| 2,761,437 | Stolte | Sept. 4, 1956 |

UNITED STATES PATENT OFFICE

CERTIFICATE OF CORRECTION

Patent No. 2,927,564                              March 8, 1960

Joseph D. Turlay et al.

It is hereby certified that error appears in the printed specification of the above numbered patent requiring correction and that the said Letters Patent should read as corrected below.

Column 5, line 13, for "decreasing" read -- increasing --.

Signed and sealed this 13th day of September 1960.

(SEAL)
Attest:
KARL H. AXLINE
Attesting Officer

ROBERT C. WATSON
Commissioner of Patents